United States Patent [19]

Adamer

[11] 4,316,916
[45] Feb. 23, 1982

[54] TREATMENT OF A COFFEE EXTRACT

[75] Inventor: Siegfried Adamer, Lausanne, Switzerland

[73] Assignee: Societe d'Assistance Technique pour Produits Nestle S.A., Lausanne, Switzerland

[21] Appl. No.: 145,226

[22] Filed: Apr. 30, 1980

Related U.S. Application Data

[63] Continuation of Ser. No. 3,348, Jan. 15, 1979, abandoned.

[30] Foreign Application Priority Data

Jan. 20, 1978 [CH] Switzerland .......................... 616/78

[51] Int. Cl.³ .............................................. A23F 5/18
[52] U.S. Cl. .................................. 426/329; 426/424; 426/477; 426/594
[58] Field of Search ...................... 426/330.3, 422, 424, 426/442, 477, 594, 329, 433; 210/724

[56] References Cited

U.S. PATENT DOCUMENTS

| | | | |
|---|---|---|---|
| 3,108,876 | 10/1963 | Turkey et al. | 426/271 |
| 3,845,220 | 10/1974 | Suzuki | 426/594 |
| 4,105,802 | 8/1978 | Cho et al. | 426/594 |

FOREIGN PATENT DOCUMENTS

| | | | |
|---|---|---|---|
| 500240 | 3/1954 | Canada | 426/594 |
| 48-131438 | 11/1973 | Japan | 426/594 |

OTHER PUBLICATIONS

M. B. Jacobs, "Manufacture and Analysis of Carbonated Beverages", 1959, pp. 70–71.

M. Sivetz, "Coffee Processing Technology", vol. II, Aromatization–Properties–Brewing–Decaffeination–Plant Design, 1963, p. 264.

*Primary Examiner*—S. Leon Bashore
*Assistant Examiner*—Michael Goldman
*Attorney, Agent, or Firm*—Vogt & O'Donnell

[57] ABSTRACT

A process for treating a coffee extract is disclosed which comprises adjusting the pH of the extract to a value of from 3.0 to 4.5 and then eliminating the subsequently formed flocculate. The pH of the extract is preferably adjusted to a value of from 3.8 to 4.2.

The coffee extract treated in accordance with the present invention may be used in the production of coffee-based gaseous beverages. A gaseous beverage produced in this way does not spurt from the container holding it when the container is opened.

9 Claims, No Drawings

TREATMENT OF A COFFEE EXTRACT

This is a continuation, of application Ser. No. 3,348, filed Jan. 15, 1979 now abandoned.

This invention relates to a process for treating a coffee extract, more particularly an extract for the preparation of a gaseous beverage based on coffee. By virtue of this treatment, the gaseous beverage in question is no longer subject to the phenomenon of "spurting" as explained hereinafter.

It is well known that gaseous beverages based on coffee, when they are prepared simply by mixing the appropriate ingredients, i.e. without any other treatment, have the troublesome property of spurting forth from the container holding them when it is opened. The sudden decompression of the beverage results in an uncontrolled effervescence and in the overflow of a large part of the contents of the container, even at refrigeration temperature.

This phenomenon may be overcome by adding to the beverage an anti-foam additive such as dimethyl polysiloxane. The disadvantage is that this additive is not permitted or even accepted in every country.

The present invention obviates the disadvantages of "spurting" whilst having the advantage of not requiring the use of an additive. The present invention therefore relates to a process for treating a coffee extract, more particularly an extract for the preparation of a gaseous beverage based on coffee, which process comprises adjusting the pH of the extract to a value of from 3.0 to 4.5 and then eliminating the subsequently formed flocculate.

The pH is preferably adjusted to a value of from 3.8 to 4.2.

It has been found that the characteristics of the coffee extract selected as starting material have no bearing on the sequence of operations to which the extract is subjected. Accordingly, it is possible to use both an infusion and an industrial extract or a coffee reconstituted by the dissolution of an instant powder in water. For reasons of pure convenience, the coffee extract is designed to have a dry matter content of from 10 to 40%.

Since coffee extracts generally have a pH value of from 5 to 6, adjustment of the pH to a value of from 3.0 to 4.5 is obtained by the addition of an acid, such as hydrochloric acid, acids of phosphorus, lactic acid, or citric acid. The extract is preferably stirred during addition of the acid.

The flocculate does not appear immediately, but instead requires a certain period of time. This period depends on the pH adjusted, on the temperature, which is preferably below 50° C., and on whether the acidified extract is stirred or left standing. In practice, a period of from 30 minutes to 24 hours is sufficient to obtain correct flocculation. The flocculate may then be eliminated by fine filtration or by centrifuging. In many cases, it is preferred to wait until the flocculate has precipitated. In this case, the precipitate may again be eliminated by filtration or centrifuging, but also by simple decantation of the supernatant liquid phase. The quantities of solid materials thus eliminated are minimal. Normally, they only amount to from 5 to 15%, based on the solids content of the coffee.

The liquid phase recovered may then be directly gasified or even dried to obtain a powder which, by the simple addition of carbonated water, will give the required beverage. Various ingredients, such as flavourings, sugar, or vanillin, may, of course, be added to the liquid to be gasified or dried.

It is preferred to add to the liquid in question small quantities of lecithin in the order of 0.1% which represents from 2 to 10 ppm in the final gaseous beverage which normally has a dry matter content of from 7 to 12%.

As already known, gasification may be effected by bubbling carbon dioxide into the liquid under pressure or by adding salts such as carbonates and bicarbonates and, if necessary, by adjusting the final pH value which is preferably from 2.5 to 4.

As mentioned above, the coffee-based gaseous beverage obtained from the extract treated in accordance with the present invention does not spurt forth from the container holding it when the container is opened. Instead, bubbles which burst at the surface are merely formed. This beverage is in the form of a clear liquid which, if desired, may be rendered turbid or opaque by the addition of an opacifying agent, for example, a gum or pulp. It is also possible to add coffee grounds and, in this way, to obtain a gaseous beverage of the "Turkish coffee" type.

The process according to the present invention is illustrated by the following Examples in which the percentages quoted represent % by weight.

EXAMPLE 1

Orthophosphoric acid is added while stirring to 51 kg of an industrial coffee extract having a dry matter content of 35.3% (extract normally intended to be dried to form an instant coffee powder) until a pH value of 3.25 is obtained. This operation is carried out at a temperature of from 20° to 22° C. After standing for 6 hours in the cold (4° C.), a flocculate has formed, having accumulated in the form of a precipitate. This precipitate, which represents 11.5% by weight of the coffee solids, is eliminated by centrifuging. The washing waters of the precipitate are added to the supernatant phase so that a coffee extract having a dry matter content of 25.30% is obtained.

The extract is then diluted with demineralised water (15 g to 1 liter) and sweetened by the addition of 100 g of sugar per liter. After adjustment of the pH value to 3.4 by the addition of orthophosphoric acid, the liquid is introduced into a carbonator. In the carbonator, $CO_2$ is bubbled through the liquid in a quantity of 6.5 g per liter for gasification.

The gaseous beverage obtained is then bottled in 30 cl bottles.

When the bottles are subsequently opened after having been turned over 4 times, there is no sign of any overflow. Bubbles are formed in the beverage, bursting at the surface.

By way of comparison, the procedure described above is repeated using an untreated coffee extract, i.e. a coffee extract which has not been acidified to a pH value of 3.25 and centrifuged. When the bottles are opened, violent effervescence occurs, the product foams and a large part of it ends up by overflowing. According to the samples, from 30 to 70% of the beverage has escaped from the container and is therefore lost to the consumer.

EXAMPLE 2

423 kg of an industrial coffee extract having a dry matter content of 36.1% are acidified to a pH value of 3.8 using orthophosphoric acid (15.4 kg). This operation is carried out at a temperature of from 28° to 30° C. After standing for 1 hour at a temperature of 25° C., the solids formed are eliminated by centrifuging. Lecithin is added to the supernatant liquid in a quantity of 1 gram per liter and the whole is introduced into a spray drying tower. An instant coffee powder having a density in the order of 200 g per liter is thus obtained.

By adding 4 g of this powder to 1 liter of carbonated water, a coffee-based gaseous beverage is obtained. This beverage may be directly consumed as such or may be bottled in 30 cl bottles. When these bottles are subsequently opened, no spurting occurs.

By way of comparison, a coffee-based gaseous beverage prepared as described above, but without the treatment according to the present invention, vigorously spurts forth from the bottles when they are opened.

EXAMPLE 3

2.25 kg of orthophosphoric acid are progressively added to 270 kg of a coffee extract having a dry matter content of 12% to obtain a pH value of 4.16. This operation is carried out at 25° C. After cooling to 4° C., the solids are left to form over a period of about 30 minutes and are eliminated by centrifuging.

The supernatant liquid obtained is gasified in the same way as described in Example 1. A coffee-based gaseous beverage is thus obtained, being packaged in 30 cl tin cans of the easy-opening type. When the cans are opened, the beverage does not overflow.

EXAMPLE 4

113 kg of demineralised water are added to 210 kg of an industrial coffee extract previously de-aromatised by stripping and having a dry matter content of 54% to obtain an extract having a dry matter content of 35%. Orthophosphoric acid is then added, with stirring until a pH value of 3.95 is obtained. This operation is carried out at a temperature of from 28° to 30° C. After standing for 24 hours at 4° C., 30 kg of an industrial coffee aroma (obtained, for example, by the stripping operation mentioned above) are added. After standing for another 10 hours at 14° C., the precipitate which has progressively formed is eliminated by centrifuging.

Preparation of the gaseous beverage is then completed as described in Example 1 with the addition of lecithin as described in Example 2.

The gaseous beverage is question does not spurt forth when it is suddenly returned to atmospheric pressure.

I claim:

1. A process for the preparation of a coffee extract suitable for carbonation which does not include the addition of anti-foaming additives, which comprises adjusting the pH of the extract to a value of from 3.0 to 4.5, and then eliminating the subsequently formed flocculate.

2. A process as claimed in claim 1, wherein the pH of the extract is adjusted to a value of from 3.8 to 4.2.

3. A process as claimed in claim 1, wherein the coffee extract has a dry matter content of from 10 to 40%.

4. A process as claimed in claim 1, wherein the pH value is adjusted while the extract is stirred.

5. A process as claimed in claim 1, wherein the pH value is adjusted by the addition of hydrochloric acid, acids of phosphorus, lactic acid or citric acid.

6. A process as claimed in claim 1, wherein the flocculate is eliminated by filtration, centrifuging or decantation.

7. A process as claimed in claim 1, wherein after the flocculate is eliminated, lecithin is added to the resulting extract in an amount of about 0.1% by weight.

8. A coffee extract when treated by a process as claimed in claim 1.

9. A carbonated beverage prepared by carbonating the coffee extract of claim 8.

* * * * *